(12) United States Patent
Bae et al.

(10) Patent No.: US 12,190,845 B2
(45) Date of Patent: Jan. 7, 2025

(54) PROCESSOR AND ELECTRONIC DEVICE INCLUDING THE SAME

(71) Applicant: Samsung Display Co., Ltd., Yongin-si (KR)

(72) Inventors: Jongman Bae, Seoul (KR); Jundal Kim, Asan-si (KR); Hyunsu Kim, Hwaseong-si (KR); Dong-Won Park, Yongin-si (KR); Junyong Song, Hwaseong-si (KR); Taeyoung Jin, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 30 days.

(21) Appl. No.: 18/081,062

(22) Filed: Dec. 14, 2022

(65) Prior Publication Data

US 2023/0260479 A1 Aug. 17, 2023

(30) Foreign Application Priority Data

Feb. 15, 2022 (KR) .................. 10-2022-0019608

(51) Int. Cl.
*H03L 7/07* (2006.01)
*G09G 5/00* (2006.01)

(52) U.S. Cl.
CPC ..... *G09G 5/008* (2013.01); *G09G 2310/0291* (2013.01); *G09G 2330/021* (2013.01)

(58) Field of Classification Search
CPC ............ H04W 88/06; H04W 52/0238; H04W 52/0283; H04W 24/08; H04W 16/14; H04W 72/1215; H04W 84/12; H04W 4/80; H04B 1/1615; H04B 1/40; H04B 1/10; H04B 1/406; H04B 1/0028; H04B 1/04; H04B 1/0475; H04B 1/123; H04B 1/16; H03L 7/18; H03L 2207/08; H03L 7/08; H03L 5/02; H03L 2207/06; H03L 7/0802; H03L 7/099; H03L 7/0891; H03L 7/103

(Continued)

(56) References Cited

U.S. PATENT DOCUMENTS 7,137,591 B2 * 11/2006 Carter .................. B64C 27/52
244/17.27
7,197,591 B2 3/2007 Kwa et al.

(Continued)

FOREIGN PATENT DOCUMENTS

JP 2021136603 A 9/2021
KR 101642709 B1 7/2016

(Continued)

*Primary Examiner* — Eva Y Puente
(74) *Attorney, Agent, or Firm* — CANTOR COLBURN LLP

(57) ABSTRACT

An electronic device includes a host processor including a data transmitter, a driving driver, and a display panel. The data transmitter includes a phase locked loop that generates a first clock and a second clock, a clock block that receives the first clock, a plurality of data blocks that receives the second clock, a first buffer connected between the phase locked loop and the clock block, and a plurality of second buffers respectively connected between the phase locked loop and the plurality of data blocks, and the first buffer and each of the plurality of second buffers may be activated or deactivated depending on an interface mode.

20 Claims, 9 Drawing Sheets

(58) Field of Classification Search
USPC .......................................................... 375/295
See application file for complete search history.

(56) References Cited

U.S. PATENT DOCUMENTS

| | | | |
|---|---|---|---|
| 9,141,162 | B2 | 9/2015 | Narayanan et al. |
| 9,436,209 | B2* | 9/2016 | Spinnler ................... H03L 7/07 |
| 9,805,687 | B2 | 10/2017 | Han |
| 10,014,862 | B2 | 7/2018 | Hwang et al. |
| 2009/0324215 | A1* | 12/2009 | Yin ....................... H04J 3/0688 |
| | | | 398/2 |
| 2016/0218724 | A1* | 7/2016 | Strzelecki ............... H03L 7/091 |
| 2017/0220517 | A1* | 8/2017 | Khan ........................ H04B 1/40 |
| 2022/0043161 | A1* | 2/2022 | Antonov ................. G01S 19/32 |

FOREIGN PATENT DOCUMENTS

| | | |
|---|---|---|
| KR | 102250493 B1 | 5/2021 |
| KR | 102261300 B1 | 6/2021 |

\* cited by examiner

PROCESSOR AND ELECTRONIC DEVICE INCLUDING THE SAME

This application claims priority to Korean Patent Application No. 10-2022-0019608, filed on Feb. 15, 2022, and all the benefits accruing therefrom under 35 U.S.C. § 119, the content of which in its entirety is herein incorporated by reference.

BACKGROUND

1. Field

Embodiments of the disclosure described herein relate to a processor with reduced power consumption and an electronic device including the processor.

2. Description of the Related Art

An electronic device may include a host processor, a driving driver, and a display panel. The host processor may transmit input image data to the driving driver, and the driving driver may generate a data signal based on the input image data. The host processor and the driving driver may be connected to each other through a predetermined interface. The host processor includes a data transmitter, and frame data (or commands) may be transmitted from the host processor to the driving driver.

SUMMARY

Embodiments of the disclosure provide a processor with reduced power consumption and an electronic device including the processor.

According to an embodiment of the disclosure, an electronic device includes a host processor including a data transmitter, a driving driver which is connected to the host processor in an interface mode and receives data from the host processor, and a display panel which is controlled by the driving driver. In such an embodiment, the data transmitter includes a phase locked loop which generates a first clock and a second clock, a clock block which receives the first clock and output a clock signal to a clock lane, a plurality of data blocks which receive the second clock and respectively output serial data to a plurality of data lanes, a first buffer connected between the phase locked loop and the clock block, and a plurality of second buffers respectively connected between the phase locked loop and the plurality of data blocks, and the first buffer and each of the plurality of second buffers are activated or deactivated depending on the interface mode.

According to an embodiment, the data transmitter may further include a voltage regulator which generates a voltage provided to the clock block and the plurality of data blocks, a third buffer connected between the voltage regulator and the clock block, and a plurality of fourth buffers respectively connected between the voltage regulator and the plurality of data blocks, and the third buffer and each of the plurality of fourth buffers may be activated or deactivated depending on the interface mode.

According to an embodiment, when the interface mode is a first interface mode, the first buffer, the plurality of second buffers, the third buffer, and the plurality of fourth buffers may be all activated.

According to an embodiment, when the interface mode is a second interface mode different from the first interface mode, the first buffer and the third buffer may be deactivated, at least one second buffer of the plurality of second buffers may be activated and the remaining second buffers of the plurality of second buffers may be deactivated, and at least one fourth buffer of the plurality of fourth buffers may be activated and the remaining fourth buffers of the plurality of fourth buffers may be deactivated.

According to an embodiment, in the first interface mode, both the clock lane and the plurality of data lanes may be used, and in the second interface mode, at least one data lane selected from the clock lane and the plurality of data lanes may be used.

According to an embodiment, the plurality of data blocks may include a first data block, a second data block, a third data block, and a fourth data block. In such an embodiment, the plurality of second buffers may include a first clock buffer connected between the first data block and the phase locked loop, a second clock buffer connected between the second data block and the phase locked loop, a third clock buffer connected between the third data block and the phase locked loop, and a fourth clock buffer connected between the fourth data block and the phase locked loop. In such an embodiment, the plurality of fourth buffers may include a first voltage buffer connected between the first data block and the voltage regulator, a second voltage buffer connected between the second data block and the voltage regulator, a third voltage buffer connected between the third data block and the voltage regulator, and a fourth voltage buffer connected between the fourth data block and the voltage regulator.

According to an embodiment, in the second interface mode, the first clock buffer and the first voltage buffer may be activated, and the second clock buffer, the third clock buffer, the fourth clock buffer, the second voltage buffer, the third voltage buffer, and the fourth voltage buffer may be deactivated.

According to an embodiment, in the second interface mode, the first clock buffer, the second clock buffer, the first voltage buffer, and the second voltage buffer may be activated, and the third clock buffer, the fourth clock buffer, the third voltage buffer, and the fourth voltage buffer may be deactivated.

According to an embodiment, the electronic device may further include a signal generator which generates control signals for controlling each of operations of the first buffer, the plurality of second buffers, the third buffer, and the plurality of fourth buffers depending on the interface mode.

According to an embodiment, a distance between an input terminal of the first buffer and an output terminal of the phase locked loop may be less than a distance between an output terminal of the first buffer and an input terminal of the clock block.

According to an embodiment, a distance between an input terminal of each of the plurality of second buffers and an output terminal of the phase locked loop may be less than each of distances between output terminals of the plurality of second buffers and input terminals of the plurality of data blocks.

According to an embodiment, the clock block and each of the plurality of data blocks may include a clock divider which divides the first clock or the second clock by an integer multiple, a digital processor which receives a signal from the clock divider and digitally processes the signal, a low power driver which processes data received from the digital processor and outputs a signal to the clock lane or the plurality of data lanes when the data transmitter operates in a low power mode, a serial converter which converts the data received from the digital processor into serial data when the data transmitter operates in a high-speed mode, and a high-speed driver which processes the serial data received from the serial converter to output a signal to the clock lane or the plurality of data lanes when the data transmitter operates in the high-speed mode.

According to an embodiment of the disclosure, the processor may include a data transmitter which outputs data through a predetermined interface mode. In such an embodiment, The data transmitter includes a phase locked loop which generates a first clock and a second clock, a clock block which receives the first clock and output a clock signal to a clock lane, a plurality of data blocks which receives the second clock and respectively outputs serial data to a plurality of data lanes, a first buffer connected between the phase locked loop and the clock block, and a plurality of second buffers respectively connected between the phase locked loop and the plurality of data blocks, and the first buffer and each of the plurality of second buffers are activated or deactivated depending on the interface mode.

According to an embodiment, the data transmitter may further include a voltage regulator which generates a voltage provided to the clock block and the plurality of data blocks, a third buffer connected between the voltage regulator and the clock block, and a plurality of fourth buffers respectively connected between the voltage regulator and the plurality of data blocks, and the third buffer and each of the plurality of fourth buffers may be activated or deactivated depending on the interface mode.

According to an embodiment, when the interface mode is a first interface mode, the first buffer, the plurality of second buffers, the third buffer, and the plurality of fourth buffers may be all activated.

According to an embodiment, when the interface mode is a second interface mode different from the first interface mode, the first buffer and the third buffer may be deactivated, at least one second buffer of the plurality of second buffers may be activated and the remaining second buffers of the plurality of second buffers may be deactivated, and at least one fourth buffer of the plurality of fourth buffers may be activated and the remaining fourth buffers of the plurality of fourth buffers may be deactivated.

According to an embodiment, the processor may further include a signal generator which generates control signals for controlling each of operations of the first buffer, the plurality of second buffers, the third buffer, and the plurality of fourth buffers depending on the interface mode.

According to an embodiment, a distance between an input terminal of the first buffer and an output terminal of the phase locked loop may be less than a distance between an output terminal of the first buffer and an input terminal of the clock block.

According to an embodiment, a distance between an input terminal of each of the plurality of second buffers and an output terminal of the phase locked loop may be less than each of distances between output terminals of the plurality of second buffers and input terminals of the plurality of data blocks.

According to an embodiment, the clock block and each of the plurality of data blocks may include a clock divider which divides the first clock or the second clock by an integer multiple, a digital processor which receives a signal from the clock divider and digitally processes the signal, a low power driver which processes data received from the digital processor and outputs a signal to the clock lane or the plurality of data lanes when the data transmitter operates in a low power mode, a serial converter which converts the data received from the digital processor into serial data when the data transmitter operates in a high-speed mode, and a high-speed driver which processes the serial data received from the serial converter to output a signal to the clock lane or the plurality of data lanes when the data transmitter operates in the high-speed mode.

BRIEF DESCRIPTION OF THE DRAWINGS

The above and other features of the disclosure will become apparent by describing in detail embodiments thereof with reference to the accompanying drawings, in which.

DETAILED DESCRIPTION

Figure 1:
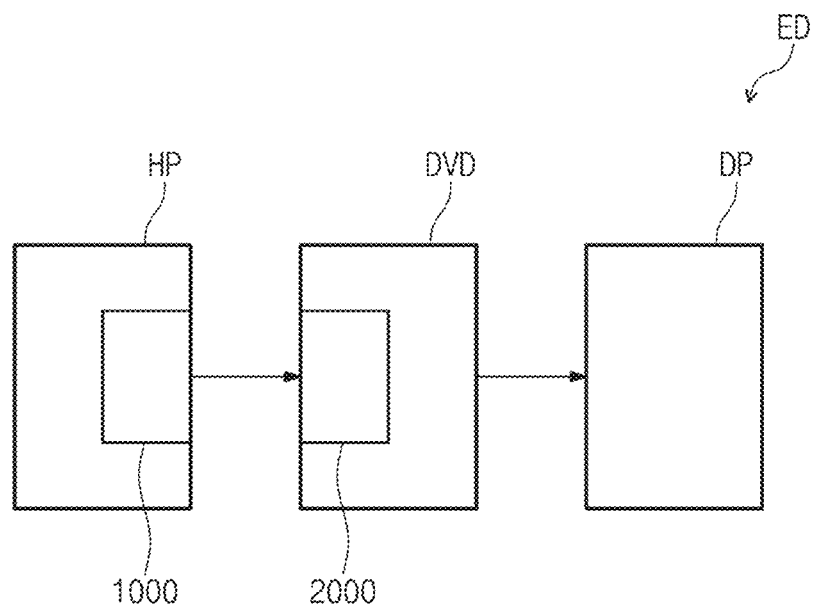
FIG. 1 is a block diagram of an electronic device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the disclosure.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The terms "part" and "unit" mean a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmware, micro-codes, circuits, data, databases, data structures, tables, arrays or variables.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the disclosure.

Hereinafter, embodiments of the disclosure will be described with reference to the accompanying drawings.

FIG. 1 is a block diagram of an electronic device according to an embodiment of the disclosure.

Referring to FIG. 1, an embodiment of an electronic device ED may include a host processor HP (or a processor), a driving driver DVD, and a display panel DP. The electronic device ED may further include a memory, a camera, and various sensors in addition to the configuration illustrated in FIG. 1.

The electronic device ED may be a device activated depending on an electrical signal. The electronic device ED may process image data and may display the processed image data through the display panel DP. In an embodiment, for example, the electronic device ED may be a mobile phone, a tablet, a car navigation system, a game console, or a wearable device, but is not limited thereto.

The host processor HP may be implemented with an integrated circuit, a system on a chip, an application processor, or a mobile application processor, but is not particularly limited thereto. The host processor HP may control various components included in the electronic device ED, for example, the driving driver DVD.

The host processor HP may include a data transmitter 1000. In an embodiment, the data transmitter 1000 may operate in a way such that undesired clocks and voltages are not provided to blocks that are deactivated according to an interface mode. Accordingly, the host processor HP capable of being universally applicable to various interfaces and having reduced power consumption may be provided. This will be more fully detailed later.

The driving driver DVD may control the display panel DP. In an embodiment, for example, the driving driver DVD may include a data receiver 2000. The driving driver DVD may be connected to the host processor HP in a predetermined interface mode. The driving driver DVD may receive data, for example, an input image signal and a control signal from the host processor HP, and may generate an output image signal obtained by converting a data format to meet the interface specification of the display panel DP. The driving driver DVD may provide a scan driving signal, a data driving signal, and an output image signal to the display panel DP.

The display panel DP may be configured to actually generate an image. The display panel DP may include a plurality of pixels, and is controlled by the driving driver DVD to display an image. The display panel DP may be a light emitting display panel, for example, the display panel DP may be an organic light emitting display panel, an inorganic light emitting display panel, an organic-inorganic light emitting display panel, a quantum dot display panel, a micro LED display panel, or a nano LED display panel, but is not particularly limited thereto.

Figure 2:
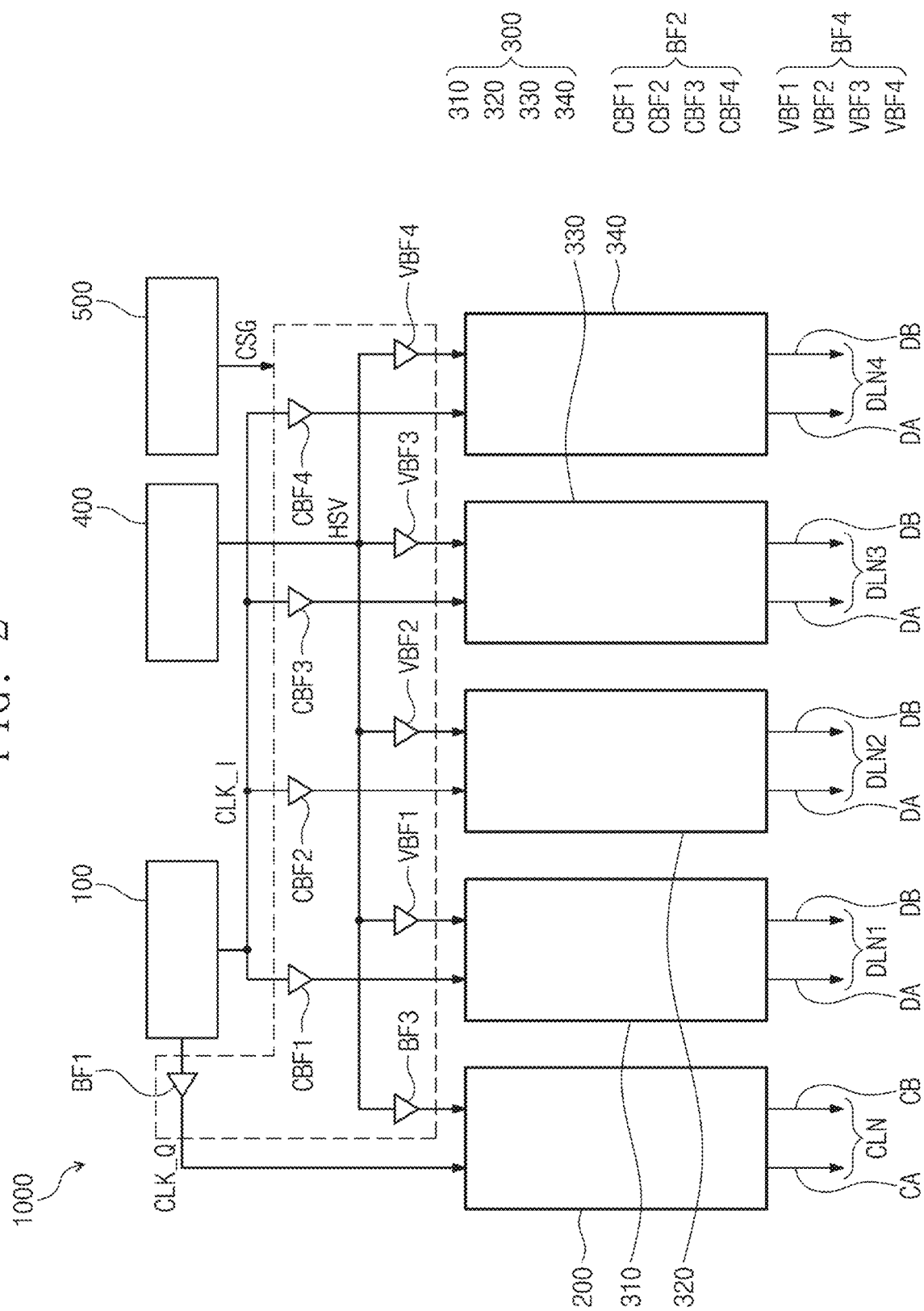
FIG. 2 is a block diagram of a data transmitter according to an embodiment of the disclosure.

FIG. 2 is a block diagram of a data transmitter according to an embodiment of the disclosure.

Referring to FIG. 2, an embodiment of the data transmitter 1000 may include a phase locked loop 100, a clock block 200, a plurality of data blocks 300, a voltage regulator 400, and a signal generator 500. Although not illustrated in FIG. 2, the data transmitter 1000 may further include configurations for the operation of the data transmitter 1000. In an embodiment, for example, the data transmitter 1000 may further include a bias circuit that generates a current.

The phase locked loop 100 may generate a first clock CLK_Q and a second clock CLK_I. A first buffer BF1 and a plurality of second buffers BF2 may be connected to an output terminal of the phase locked loop 100. The first buffer BF1 and the second buffers BF2 may be configured to be selectively activated or deactivated. In an embodiment, for example, clock gating may be applied to the first buffer BF1 and each of the second buffers BF2. Accordingly, the first clock CLK_Q and the second clock CLK_I may be provided only to used blocks among the clock block 200 and the plurality of data blocks 300.

The clock block 200 may receive the first clock CLK_Q and may output a clock signal to a clock lane CLN. The clock lane CLN may include two transmission lines CA and CB.

The plurality of data blocks 300 may include a first data block 310, a second data block 320, a third data block 330, and a fourth data block 340. Each of the first to fourth data blocks 310, 320, 330, and 340 may receive the second clock CLK_I and may output serial data to first to fourth data lanes DLN1, DLN2, DLN3, and DLN4, respectively. Each of the first to fourth data lanes DLN1, DLN2, DLN3, and DLN4 may include two transmission lines DA and DB.

Each of the plurality of data blocks 300 may operate in a high-speed (HS) mode or a low-power (LP) mode. In an embodiment, for example, when each of the plurality of data blocks 300 operates in the high-speed mode (or the HS mode), differential signals may be transmitted through two transmission lines DA and DB. In an embodiment, for example, when each of the plurality of data blocks 300 operates in the low-power mode (or the LP mode), a single output signal may be transmitted through two transmission lines DA and DB. However, this is only an example and is not particularly limited thereto.

The voltage regulator 400 may generate a voltage HSV to be provided to the clock block 200 and the plurality of data blocks 300. In an embodiment, for example, the voltage regulator 400 may generate the voltage HSV used for operating in the high-speed mode and may transmit the voltage HSV to the clock block 200 and the plurality of data blocks 300. A third buffer BF3 and a plurality of fourth buffers BF4 may be connected to an output terminal of the voltage regulator 400. The third buffer BF3 and the plurality of fourth buffers BF4 may be configured to be selectively activated or deactivated. In an embodiment, for example, clock gating may be applied to the third buffer BF3 and each of the fourth buffers BF4. Accordingly, the voltage HSV may be provided only to used blocks among the clock block 200 and the plurality of data blocks 300.

A distance (or a length of line connected) between an input terminal of the first buffer BF1 and an output terminal of the phase locked loop 100 may be less than a distance between an output terminal of the first buffer BF1 and an input terminal of the clock block 200. In an embodiment, for example, the first buffer BF1 may be disposed as close to the phase locked loop 100 as possible. In such an embodiment, a loading of a path through which the first clock CLK_Q is transmitted may be minimized. The distances may be identified through a layout of the data transmitter 1000. FIG. 2 is a block diagram representing the distance relationship in terms of the length of a line.

In an embodiment, a distance between an input terminal of each of the plurality of second buffers BF2 and the output terminal of the phase locked loop 100 may be less than each of the distances between output terminals of the plurality of second buffers BF2 and input terminals of the plurality of data blocks 300. In an embodiment, for example, each of the plurality of second buffers BF2 may be disposed as close to the phase locked loop 100 as possible. In such an embodiment, a loading of a path through which the second clock CLK_I is transmitted may be minimized.

The plurality of second buffers BF2 may include a first clock buffer CBF1 connected between the first data block 310 and the phase locked loop 100, a second clock buffer CBF2 connected between the second data block 320 and the phase locked loop 100, a third clock buffer CBF3 connected between the third data block 330 and the phase locked loop 100, and a fourth clock buffer CBF4 connected between the fourth data block 340 and the phase locked loop 100.

The plurality of fourth buffers BF4 may include a first voltage buffer VBF1 connected between the first data block 310 and the voltage regulator 400, a second voltage buffer VBF2 connected between the second data block 320 and the voltage regulator 400, a third voltage buffer VBF3 connected between the third data block 330 and the voltage regulator 400, and a fourth voltage buffer VBF4 connected between the fourth data block 340 and the voltage regulator 400.

The signal generator 500 may generate control signals CSG for controlling each of operations of the first buffer BF1, the first to fourth clock buffers CBF1, CBF2, CBF3, and CBF4, the third buffer BF3, and the first to fourth voltage buffers VBF1, VBF2, VBF3, and VBF4 depending on an interface mode.

Figure 3:
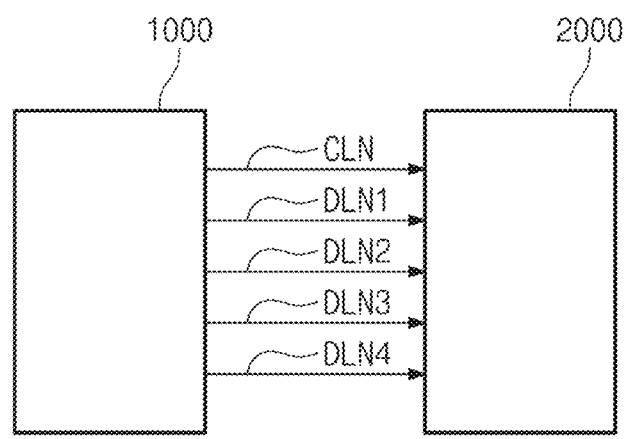
FIG. 3 is a block diagram illustrating a data transmitter and a data receiver connected in a first interface mode, according to an embodiment of the disclosure.

FIG. 3 is a block diagram illustrating a data transmitter and a data receiver connected in a first interface mode, according to an embodiment of the disclosure.

FIG. 3 illustrates lanes that are used in a first interface mode. In an embodiment, for example, in the first interface mode, all of the clock lane CLN and the first to fourth data lanes DLN1, DLN2, DLN3, and DLN4 may be used.

Referring to FIGS. 2 and 3, in the first interface mode, both the clock block 200 and the plurality of data blocks 300 may be activated. The signal generator 500 may generate the control signals CSG such that the first buffer BF1, the first to fourth clock buffers CBF1, CBF2, CBF3, and CBF4, the third buffer BF3, and the first to fourth voltage buffers VBF1, VBF2, VBF3, and VBF4 may be all activated.

In the first interface mode, where the first buffer BF1, the first to fourth clock buffers CBF1, CBF2, CBF3, and CBF4, the third buffer BF3, and the first to fourth voltage buffers VBF1, VBF2, VBF3, and VBF4 are all be activated, the clock block 200 may receive the first clock CLK_Q from the phase locked loop 100 and the voltage HSV from the voltage regulator 400. In addition, each of the first to fourth data blocks 310, 320, 330, and 340 may receive the second clock CLK_I from the phase locked loop 100 and may receive the voltage HSV from the voltage regulator 400.

Figure 4A:
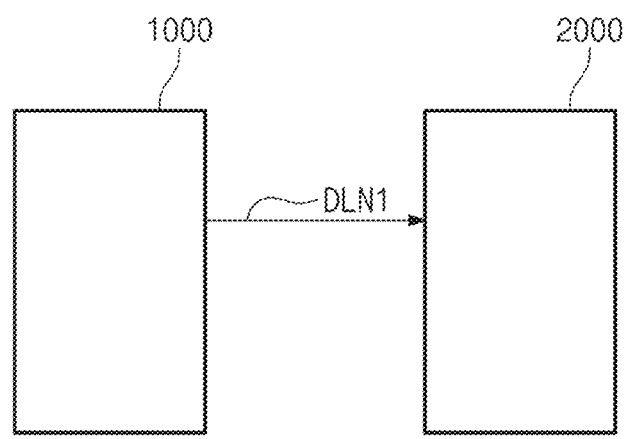
FIG. 4A is a block diagram illustrating a data transmitter and a data receiver connected in a second interface mode, according to an embodiment of the disclosure.
Figure 4B:
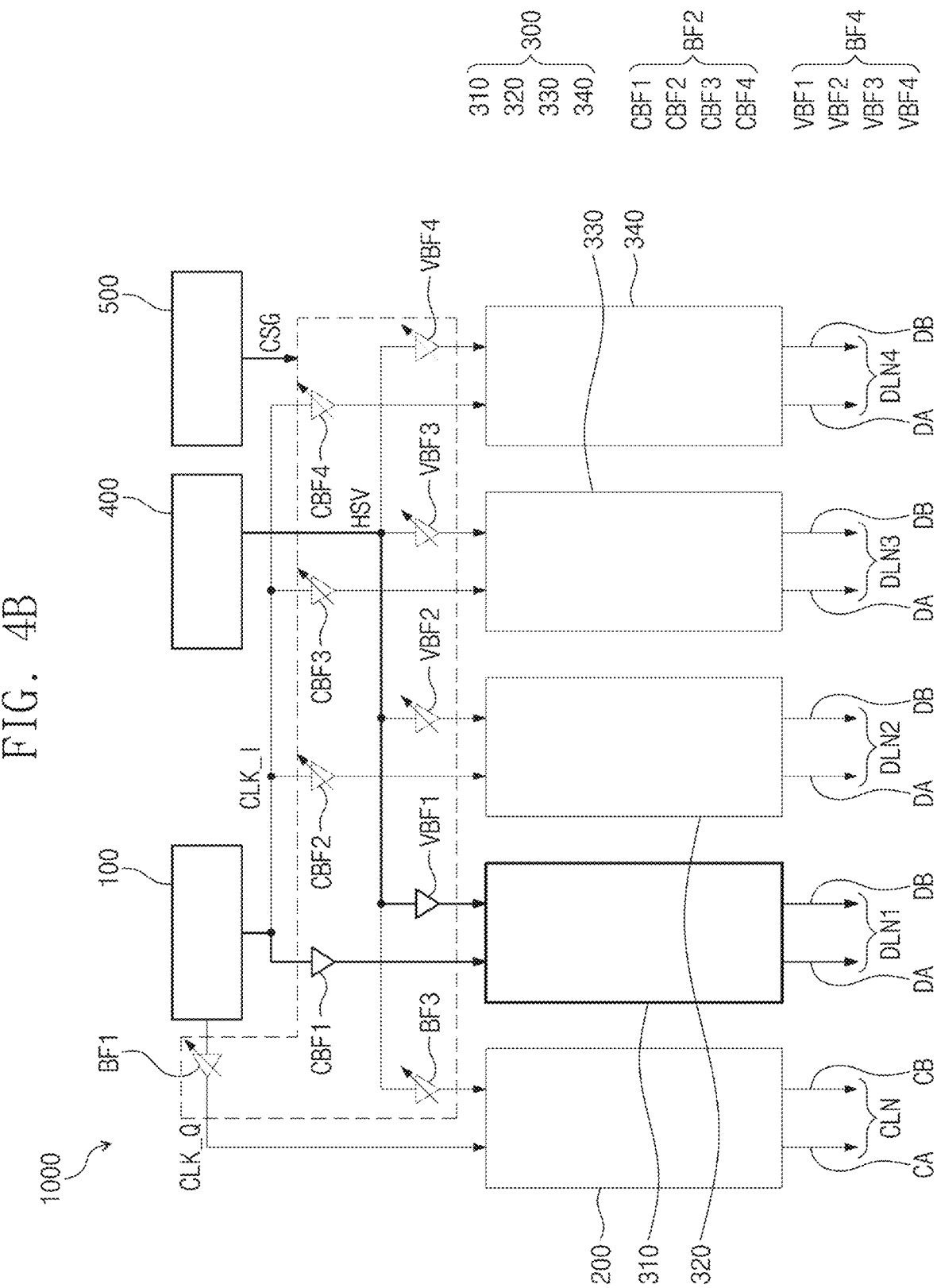
FIG. 4B is a block diagram of a data transmitter illustrated in FIG. 4A.

FIG. 4A is a block diagram illustrating a data transmitter and a data receiver connected in a second interface mode, according to an embodiment of the disclosure. FIG. 4B is a block diagram of a data transmitter illustrated in FIG. 4A.

Referring to FIGS. 4A and 4B, lanes used in a second interface mode different from the first interface mode are illustrated. A data transfer rate in the second interface mode may be faster than a data transfer rate in the first interface mode. In an embodiment, for example, when the data transfer rate in the first interface mode is 1.5 gigabits per second (Gbps), the data transfer rate in the second interface mode may be 6 Gbps.

In a case where the electronic device ED (refer to FIG. 1) is communicating in the second interface mode, at least some of the clock block 200 and the plurality of data blocks 310, 320, 330, and 340 of the host processor HP are deactivated. In an embodiment, for example, in the second interface mode, only the first data lane DLN1 may be used, and the clock lane CLN and the second to fourth data lanes DLN2, LN3, and DLN4 may not be used.

The signal generator 500 may generate the control signals CSG in a way such that the first buffer BF1, the second to fourth clock buffers CBF2, CBF3, and CBF4, the third buffer BF3, and the second to fourth voltage buffers VBF2, VBF3, and VBF4 may be deactivated, and the first clock buffer CBF1 and the first voltage buffer VBF1 may be activated. Accordingly, in the second interface mode, the first clock CLK_Q and the voltage HSV may not be provided to the deactivated clock block 200, and the second clock CLK_I and voltage HSV may not be provided to the deactivated second to fourth data blocks 320, 330, and 340.

According to an embodiment of the disclosure, with respect to blocks not used in a specific interface mode, for example, the clock block 200 and the second to fourth data blocks 320, 330, and 340, paths through which the first and second clocks CLK_Q and CLK_I are provided may be blocked. Accordingly, since the first and second clocks CLK_Q and CLK_I are not applied to the clock block 200 and the second to fourth data blocks 320, 330, and 340, which are not used, undesired dynamic power consumption may decrease. In such an embodiment, since the voltage HSV is not provided to the unused clock block 200 and the unused second to fourth data blocks 320, 330, and 340, by blocking a path through which the voltage HSV is provided to the unused clock block 200 and the unused second to fourth data blocks 320, 330, and 340, undesired power consumption may be reduced. In such an embodiment, as power consumption by unused blocks is removed or reduced, power consumption of the electronic device ED (refer to FIG. 1) may be reduced.

Figure 5A:
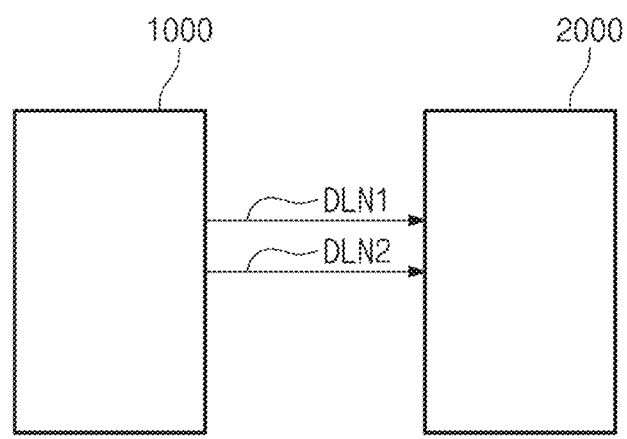
FIG. 5A is a block diagram illustrating a data transmitter and a data receiver connected in a second interface mode, according to an embodiment of the disclosure.
Figure 5B:
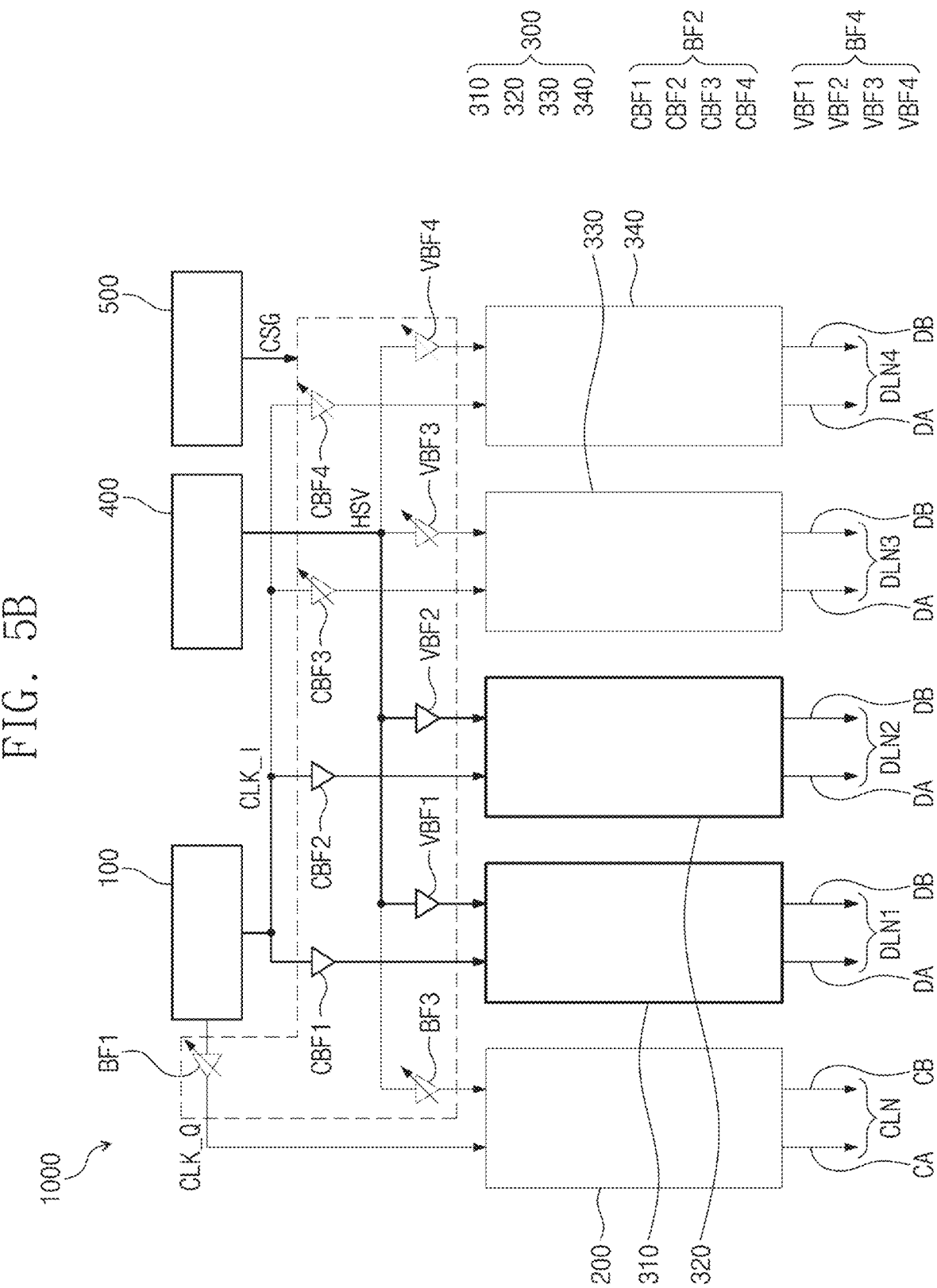
FIG. 5B is a block diagram of a data transmitter illustrated in FIG. 5A.

FIG. 5A is a block diagram illustrating a data transmitter and a data receiver connected in a second interface mode, according to an embodiment of the disclosure. FIG. 5B is a block diagram of a data transmitter illustrated in FIG. 5A.

A second interface mode illustrated in FIGS. 5A and 5B may be actually the same as the second interface mode illustrated in FIGS. 4A and 4B. In an embodiment, for example, when an operating frequency of the display panel DP (refer to FIG. 1) is increased, an amount of data to be transmitted per a unit time may increase accordingly. In this case, the second data block 320 may be additionally activated. Alternatively, the second data block 320 may be additionally activated as the data transfer rate in the second interface mode illustrated in FIGS. 5A and 5B is less than the data transfer rate in the second interface mode illustrated in FIGS. 4A and 4B.

Referring to FIGS. 5A and 5B, only the first and second data lanes DLN1 and DLN2 may be used, and the clock lane CLN and the third and fourth data lanes DLN3 and DLN4 may not be used. The signal generator 500 may generate the control signals CSG in a way such that the first buffer BF1, the third and fourth clock buffers CBF3 and CBF4, the third buffer BF3, and the third and fourth voltage buffers VBF3 and VBF4 are deactivated, and the first and second clock buffers CBF1 and CBF2 and the first and second voltage buffers VBF1 and VBF2 are activated. Accordingly, the first clock CLK_Q and the voltage HSV may not be provided to the deactivated clock block 200, and the second clock CLK_I and voltage HSV may not be provided to the deactivated second to fourth data blocks 320, 330, and 340.

Figure 6:
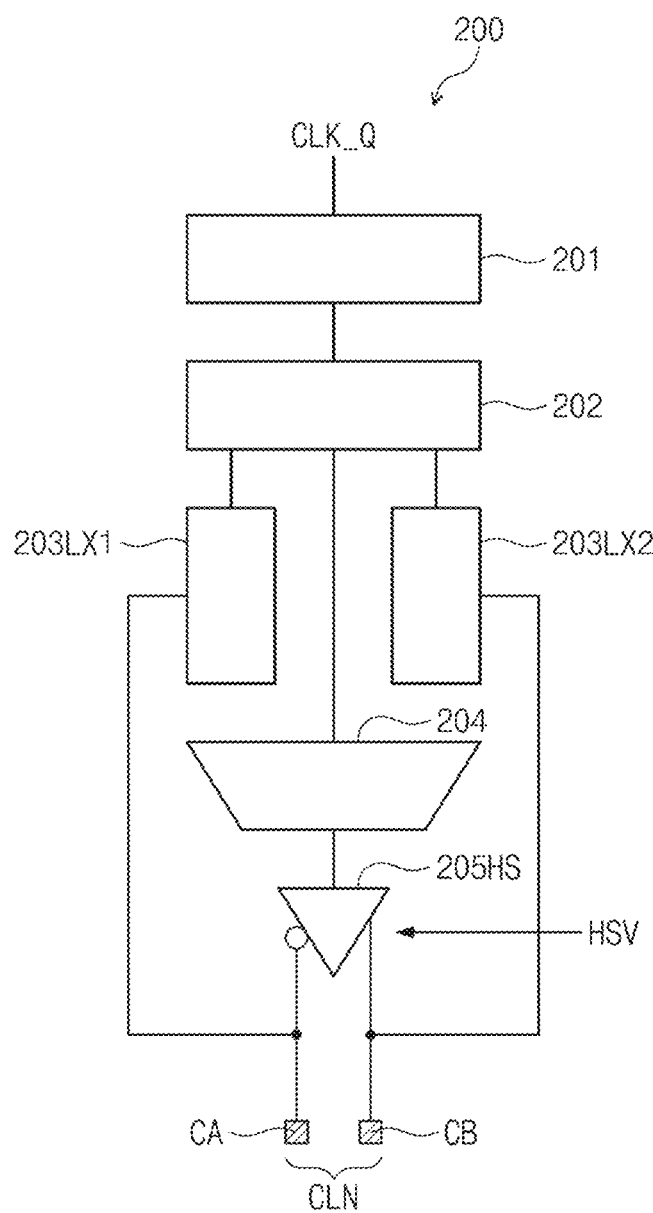
FIG. 6 is a block diagram of a clock block, according to an embodiment of the disclosure.

FIG. 6 is a block diagram of a clock block, according to an embodiment of the disclosure.

Referring to FIG. 6, an embodiment of the clock block 200 may include a clock divider 201, a digital processor 202, low-power drivers 203LX1 and 203LX2, a serial converter 204, and a high-speed driver 205HS. The clock block 200 illustrated in FIG. 6 is only an example, and the disclosure is not particularly limited thereto. The clock block 200 may be variously modified as long as the clock block 200 is configured to receive the first clock CLK_Q to generate a predetermined clock signal, and to transmit the predetermined clock signal through the clock lane CLN.

The clock divider 201 may divide the first clock CLK_Q by an integer multiple. In an embodiment, for example, the clock divider 201 may divide the first clock CLK_Q by 1/16, but is not particularly limited thereto.

The digital processor 202 may receive a signal from the clock divider 201 and digitally process the received signal. In an embodiment, for example, the digital processor 202 may process a clock signal for representing an image. In an embodiment, for example, the digital processor 202 may transmit a plurality of bits per one clock in the form of a bus. The plurality of bits may be, for example, 16 bits or 32 bits, but is not particularly limited thereto.

The low-power drivers 203LX1 and 203LX2 may process the data received from the digital processor 202 and output a clock signal to the clock lane CLN when the data transmitter 1000 (refer to FIG. 1) operates in the low-power mode. In an embodiment, for example, the low-power drivers 203LX1 and 203LX2 may include a first low-power driver 203LX1 and a second low-power driver 203LX2, the first low-power driver 203LX1 may output a signal through one transmission line CA, and the second low-power driver 203LX2 may output a signal to the other transmission line CB.

When the data transmitter 1000 (refer to FIG. 1) operates in the high-speed mode, the serial converter 204 may convert data received from the digital processor 202 into serial data. In addition, the high-speed driver 205HS may receive the voltage HSV from the voltage regulator 400 (refer to FIG. 2). The high-speed driver 205HS may process serial data received from the serial converter 204 and may output the processed serial data to the clock lane CLN. In an embodiment, for example, the high-speed driver 205HS may output differential signals through the two transmission lines CA and CB.

Figure 7:
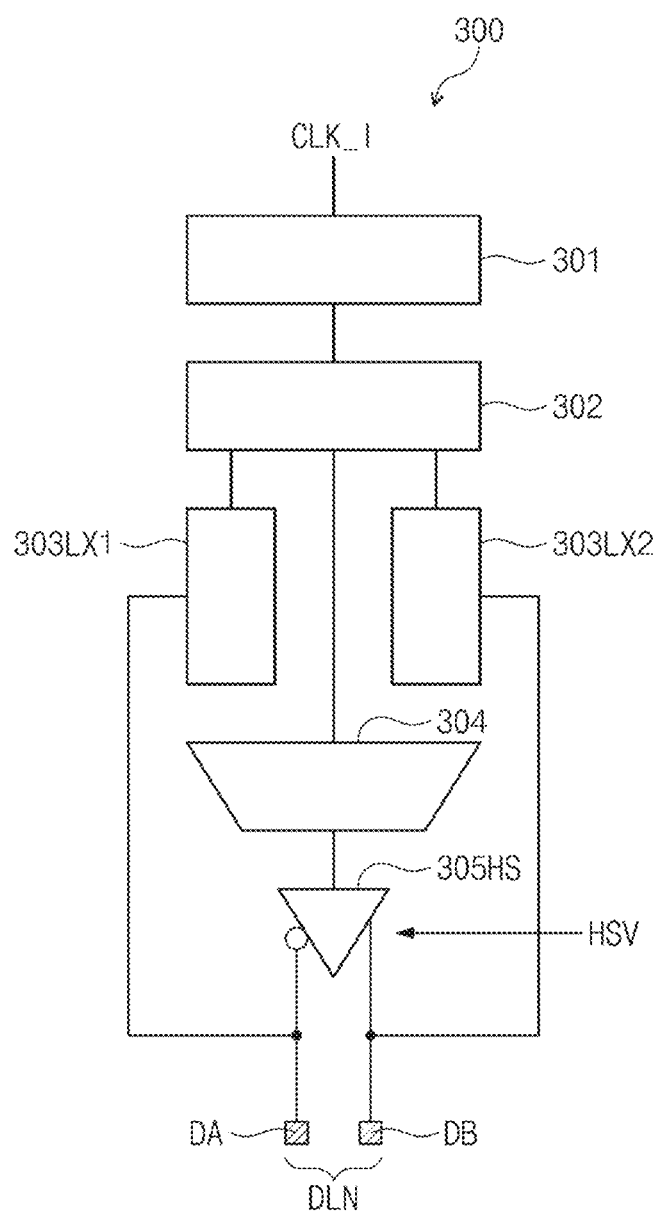
FIG. 7 is a block diagram of a data block, according to an embodiment of the disclosure.

FIG. 7 is a block diagram of a data block, according to an embodiment of the disclosure.

Referring to FIG. 7, the data block 300 may include a clock divider 301, a digital processor 302, low-power drivers 303LX1 and 303LX2, a serial converter 304, and a high-speed driver 305HS. The data block 300 illustrated in FIG. 7 is only an example, and the disclosure is not particularly limited thereto. The data block 300 may be variously modified as long as the data block 300 is configured to receive predetermined data to convert the predetermined data into serial data, and to transmit the serial data through the data lane DLN. In an embodiment, for example, the data block 300 may further include a low-power connection detector and a low-power receiver.

The clock divider 301 may divide the second clock CLK_I by an integer multiple. In an embodiment, for example, the clock divider 301 may divide the second clock CLK_I by 1/16, but is not particularly limited thereto.

The digital processor 302 may receive a signal from the clock divider 301 and digitally process the received signal. In an embodiment, for example, the digital processor 302 may process data for representing an image. In an embodiment, for example, the digital processor 302 may transmit a plurality of bits per one clock in the form of a BUS. The plurality of bits may be, for example, 16 bits or 32 bits, but is not particularly limited thereto.

The low-power drivers 303LX1 and 303LX2 may process the data received from the digital processor 302 and may output a signal to the data lane DLN when the data transmitter 1000 (refer to FIG. 1) operates in the low-power mode. In an embodiment, for example, the low-power drivers 303LX1 and 303LX2 may include a first low-power driver 303LX1 and a second low-power driver 303LX2, the first low-power driver 303LX1 may output a signal through one transmission line DA, and the second low-power driver 303LX2 may output a signal to the other transmission line DB.

When the data transmitter 1000 (refer to FIG. 1) operates in the high-speed mode, the serial converter 304 may convert data received from the digital processor 302 into serial data. In addition, the high-speed driver 305HS may receive the voltage HSV from the voltage regulator 400 (refer to FIG. 2). The high-speed driver 305HS may process serial data received from the serial converter 304 and may output the processed serial data to the data lane DLN. In an embodiment, for example, the high-speed driver 305HS may output differential signals through the two transmission lines DA and DB.

According to an embodiment of the disclosure, among the clock block and the plurality of data blocks included in the data transmitter, a path through which a clock or voltage is provided to unused blocks in a specific interface mode may be blocked. Accordingly, as power consumption by unused blocks is removed or reduced, power consumption of the electronic device may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device comprising:
a host processor including a data transmitter;
a driving driver connected to the host processor in an interface mode and which receives data from the host processor; and
a display panel which is controlled by the driving driver, and
wherein the data transmitter includes:
a phase locked loop which generates a first clock and a second clock;
a clock block which receives the first clock and outputs a clock signal to a clock lane;
a plurality of data blocks which receives the second clock and respectively outputs serial data to a plurality of data lanes;
a first buffer connected between the phase locked loop and the clock block; and
a plurality of second buffers respectively connected between the phase locked loop and the plurality of data blocks,
wherein the first buffer is activated or deactivated depending on the interface mode to allow the clock block to receive or not to receive the first clock, and
wherein each of the plurality of second buffers is activated or deactivated depending on the interface mode to allow each of the plurality of data blocks to receive or not to receive the second clock.

2. The electronic device of claim 1, wherein the data transmitter further includes:
a voltage regulator which generates a voltage provided to the clock block and the plurality of data blocks;
a third buffer connected between the voltage regulator and the clock block; and
a plurality of fourth buffers respectively connected between the voltage regulator and the plurality of data blocks, and
wherein the third buffer and each of the plurality of fourth buffers are activated or deactivated depending on the interface mode.

3. The electronic device of claim 2, wherein, when the interface mode is a first interface mode, the first buffer, the plurality of second buffers, the third buffer, and the plurality of fourth buffers are all activated.

4. The electronic device of claim 3, wherein, when the interface mode is a second interface mode different from the first interface mode, the first buffer and the third buffer are deactivated, at least one second buffer of the plurality of second buffers is activated and remaining second buffers of the plurality of second buffers are deactivated, and at least one fourth buffer of the plurality of fourth buffers is activated and remaining fourth buffers of the plurality of fourth buffers are deactivated.

5. The electronic device of claim 4, wherein, in the first interface mode, both the clock lane and the plurality of data lanes are used; and in the second interface mode, at least one data lane selected from the clock lane and the plurality of data lanes is used.

6. The electronic device of claim 4, wherein the plurality of data blocks includes a first data block, a second data block, a third data block, and a fourth data block;
the plurality of second buffers include a first clock buffer connected between the first data block and the phase locked loop, a second clock buffer connected between the second data block and the phase locked loop, a third clock buffer connected between the third data block and the phase locked loop, and a fourth clock buffer connected between the fourth data block and the phase locked loop; and
the plurality of fourth buffers include a first voltage buffer connected between the first data block and the voltage regulator, a second voltage buffer connected between the second data block and the voltage regulator, a third voltage buffer connected between the third data block and the voltage regulator, and a fourth voltage buffer connected between the fourth data block and the voltage regulator.

7. The electronic device of claim 6, wherein, in the second interface mode, the first clock buffer and the first voltage buffer are activated, and the second clock buffer, the third clock buffer, the fourth clock buffer, the second voltage buffer, the third voltage buffer, and the fourth voltage buffer are deactivated.

8. The electronic device of claim 6, wherein, in the second interface mode, the first clock buffer, the second clock buffer, the first voltage buffer, and the second voltage buffer are activated, and the third clock buffer, the fourth clock buffer, the third voltage buffer, and the fourth voltage buffer are deactivated.

9. The electronic device of claim 2, further comprising:
a signal generator which generates control signals for controlling each of operations of the first buffer, the plurality of second buffers, the third buffer, and the plurality of fourth buffers depending on the interface mode.

10. The electronic device of claim 1, wherein a distance between an input terminal of the first buffer and an output terminal of the phase locked loop is less than a distance between an output terminal of the first buffer and an input terminal of the clock block.

11. The electronic device of claim 1, wherein a distance between an input terminal of each of the plurality of second buffers and an output terminal of the phase locked loop is less than each of distances between output terminals of the plurality of second buffers and input terminals of the plurality of data blocks.

12. The electronic device of claim 1, wherein the clock block and each of the plurality of data blocks include:
a clock divider which divides the first clock or the second clock by an integer multiple;
a digital processor which receives a signal from the clock divider and digitally process the signal;
a low power driver which processes data received from the digital processor and to output a signal to the clock lane or the plurality of data lanes when the data transmitter operates in a low power mode;
a serial converter which converts the data received from the digital processor into serial data when the data transmitter operates in a high-speed mode; and
a high-speed driver which processes the serial data received from the serial converter to output a signal to the clock lane or the plurality of data lanes when the data transmitter operates in the high-speed mode.

13. A processor comprising:
a data transmitter which outputs data through an interface mode, and
wherein the data transmitter includes:
   a phase locked loop which generates a first clock and a second clock;
   a clock block which receives the first clock and outputs a clock signal to a clock lane;
   a plurality of data blocks which receives the second clock and respectively outputs serial data to a plurality of data lanes;
   a first buffer connected between the phase locked loop and the clock block; and
   a plurality of second buffers respectively connected between the phase locked loop and the plurality of data blocks,
wherein the first buffer is activated or deactivated depending on the interface mode to allow the clock block to receive or not to receive the first clock, and
wherein each of the plurality of second buffers is activated or deactivated depending on the interface mode to allow each of the plurality of data blocks to receive or not to receive the second clock.

14. The processor of claim 13, wherein the data transmitter includes:
   a voltage regulator which generates a voltage provided to the clock block and the plurality of data blocks;
   a third buffer connected between the voltage regulator and the clock block; and
   a plurality of fourth buffers respectively connected between the voltage regulator and the plurality of data blocks, and
wherein the third buffer and each of the plurality of fourth buffers are activated or deactivated depending on the interface mode.

15. The processor of claim 14, wherein, when the interface mode is a first interface mode, the first buffer, the plurality of second buffers, the third buffer, and the plurality of fourth buffers are all activated.

16. The processor of claim 15, wherein, when the interface mode is a second interface mode different from the first interface mode, the first buffer and the third buffer are deactivated, at least one second buffer of the plurality of second buffers is activated and remaining second buffers of the plurality of second buffers are deactivated, and at least one fourth buffer of the plurality of fourth buffers is activated and remaining fourth buffers of the plurality of fourth buffers are deactivated.

17. The processor of claim 14, further comprising:
   a signal generator which generates control signals for controlling each of operations of the first buffer, the plurality of second buffers, the third buffer, and the plurality of fourth buffers depending on the interface mode.

18. The processor of claim 13, wherein a distance between an input terminal of the first buffer and an output terminal of the phase locked loop is less than a distance between an output terminal of the first buffer and an input terminal of the clock block.

19. The processor of claim 13, wherein a distance between an input terminal of each of the plurality of second buffers and an output terminal of the phase locked loop is less than each of distances between output terminals of the plurality of second buffers and input terminals of the plurality of data blocks.

20. The processor of claim 13, wherein the clock block and each of the plurality of data blocks include:
   a clock divider which divides the first clock or the second clock by an integer multiple;
   a digital processor which receives a signal from the clock divider and digitally processes the signal;
   a low power driver which processes data received from the digital processor and outputs a signal to the clock lane or the plurality of data lanes when the data transmitter operates in a low power mode;
   a serial converter which converts the data received from the digital processor into serial data when the data transmitter operates in a high-speed mode; and
   a high-speed driver which processes the serial data received from the serial converter to output a signal to the clock lane or the plurality of data lanes when the data transmitter operates in the high-speed mode.

\* \* \* \* \*